J. M. HOLLADAY.
Cultivators.

No. 157,398. Patented Dec. 1, 1874.

WITNESSES:
Solon C. Kemon
Chas. A. Pettit

INVENTOR:
J. M. Holladay
BY
ATTORNEYS.

UNITED STATES PATENT OFFICE.

JAMES M. HOLLADAY, OF TWYMAN'S STORE, VIRGINIA.

IMPROVEMENT IN CULTIVATORS.

Specification forming part of Letters Patent No. 157,398, dated December 1, 1874; application filed October 19, 1874.

CASE B.

*To all whom it may concern:*

Be it known that I, JAMES M. HOLLADAY, of Twyman's Store, in the county of Spottsylvania and State of Virginia, have invented a new and Improved Cultivator; and I do hereby declare that the following is a full, clear, and exact description of the same, reference being had to the accompanying drawing, forming a part of this specification, in which—

Figure 1:
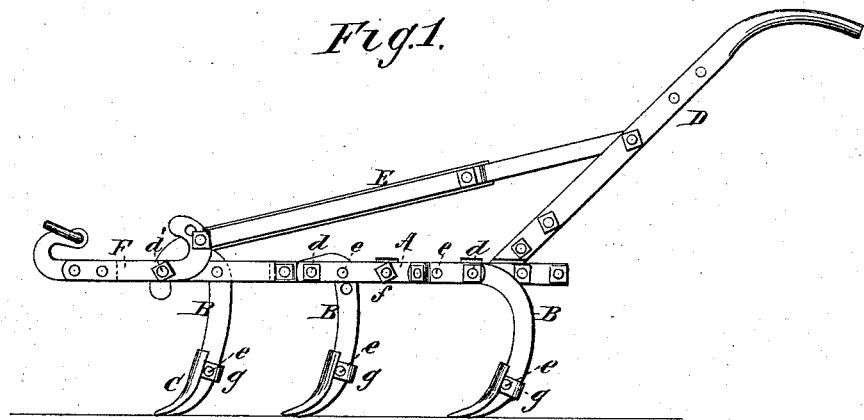
Figure 2:
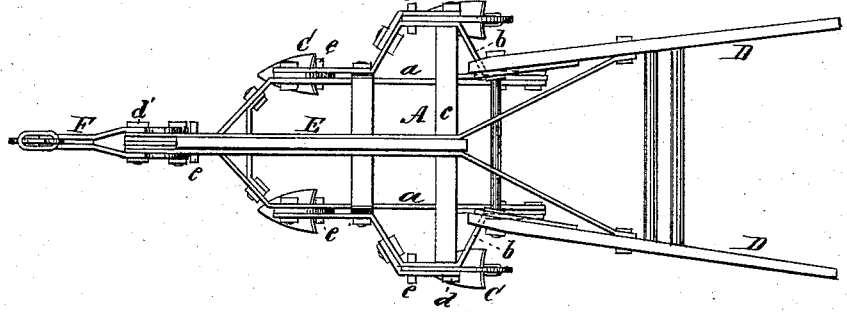

Figure 1 is a side elevation; Fig. 2, a plan view.

The object of this invention is to provide a cultivator which shall combine, in an unusual degree, strength, lightness, and efficiency, and which, by reason of its peculiar construction, is adapted to extended and diversified cultivation. It consists in the peculiar construction of the standards, hoes, frame, brace, and traction-hook, all combined and arranged as hereinafter more fully described, and pointed out in the claims.

In the drawing, A is the metallic frame, which consists of pieces $a$, $b$, and $c$, provided with lateral holes and bolted together in a manner to admit of an easy adjustment to a different arrangement of the standards. B are the standards, bent at their upper ends and fastened in the double portions of the frame by a bolt, $d$, and a brittle pin of wood, $e$, the latter for the purpose of relieving the standards from a sudden strain by the breaking of the same, and also for the purpose of adjusting the standards to different inclinations to the ground through the holes $f$. C are the hoes, which are adjustably fastened to the lower extremities of the standards through the staples $g$ and wooden pins $e$, the wooden pins being especially adapted to the purpose, as they are easily removable, and do not rust like bolts, or become loose like keys. D are the handles, which are detachably bolted to the frame A, and also to a brace and draft-bar, E. Said bar supplies the place of the old vertical supports for the handles, and makes a much more compact, less top-heavy, lighter, and yet stronger arrangement, inasmuch as it acts as a traction-bar as well as a brace, and distributes the draft to the after part of the cultivator. F is the traction-hook, which is attached to the bar E, the frame A, and the first standard by means of one and the same bolt, $d'$, the said hook being bifurcated in its rear extension and bent up in the shape of an arc, which is graduated with different adjusting-holes, which, with the aid of pins, adapt the implement to deep or shallow cultivation, or to different-sized teams.

As shown in the drawing, the standards are arranged to accommodate five hoes arranged in an angular position.

By removing the pieces $b$, however, and placing them upon the inside of pieces $a$ $a$ great variety of changes may be produced, and the hoes made to conform to almost any relative angular position that may be desired.

The implement, as thus described, is intended to be independent in its operation and uses; but, by reason of its detachable and adjustable connections, it is also especially adapted to be used with a double-wheeled cultivator, upon which application for Letters Patent is made by me of this same date.

Having thus described my invention, what I claim as new is—

1. The standards B, bent at right angles at their upper ends, in combination with the frame A of double bars $a$ $b$, and the brake-pins $e$, substantially as shown and described.

2. In combination, the hook F, having its rear portion bifurcated, bent in the shape of an arc, and provided with adjusting-holes, the brace and draft-bar E, and the front standard, all having a common bolt, $d'$, substantially as described.

JAMES M. HOLLADAY.

Witnesses:
R. M. CONWAY,
T. T. DILLARD.